Aug. 18, 1942.   H. C. COGAN ET AL   2,293,330
WELDING MACHINE
Filed July 12, 1941   4 Sheets-Sheet 4
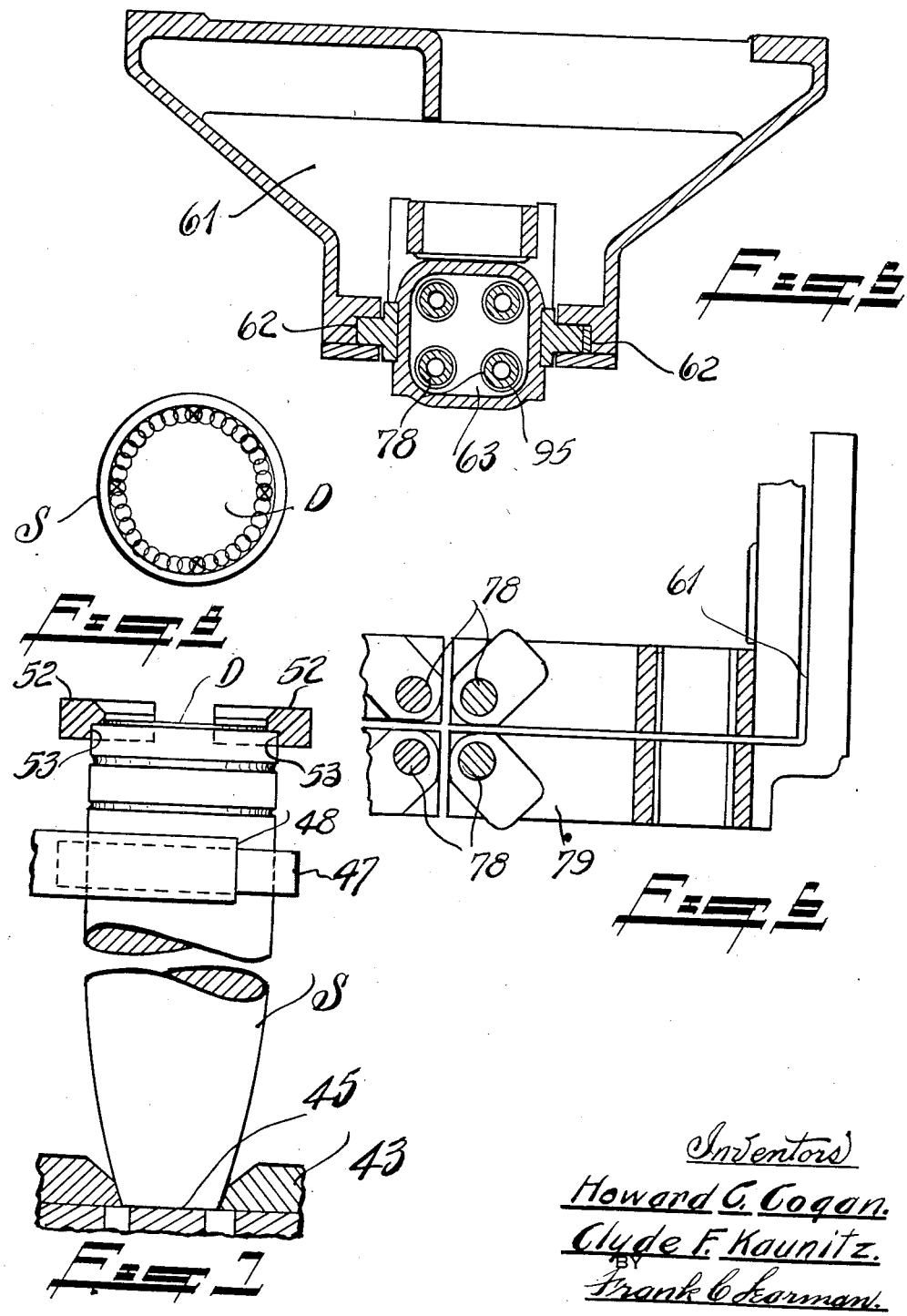

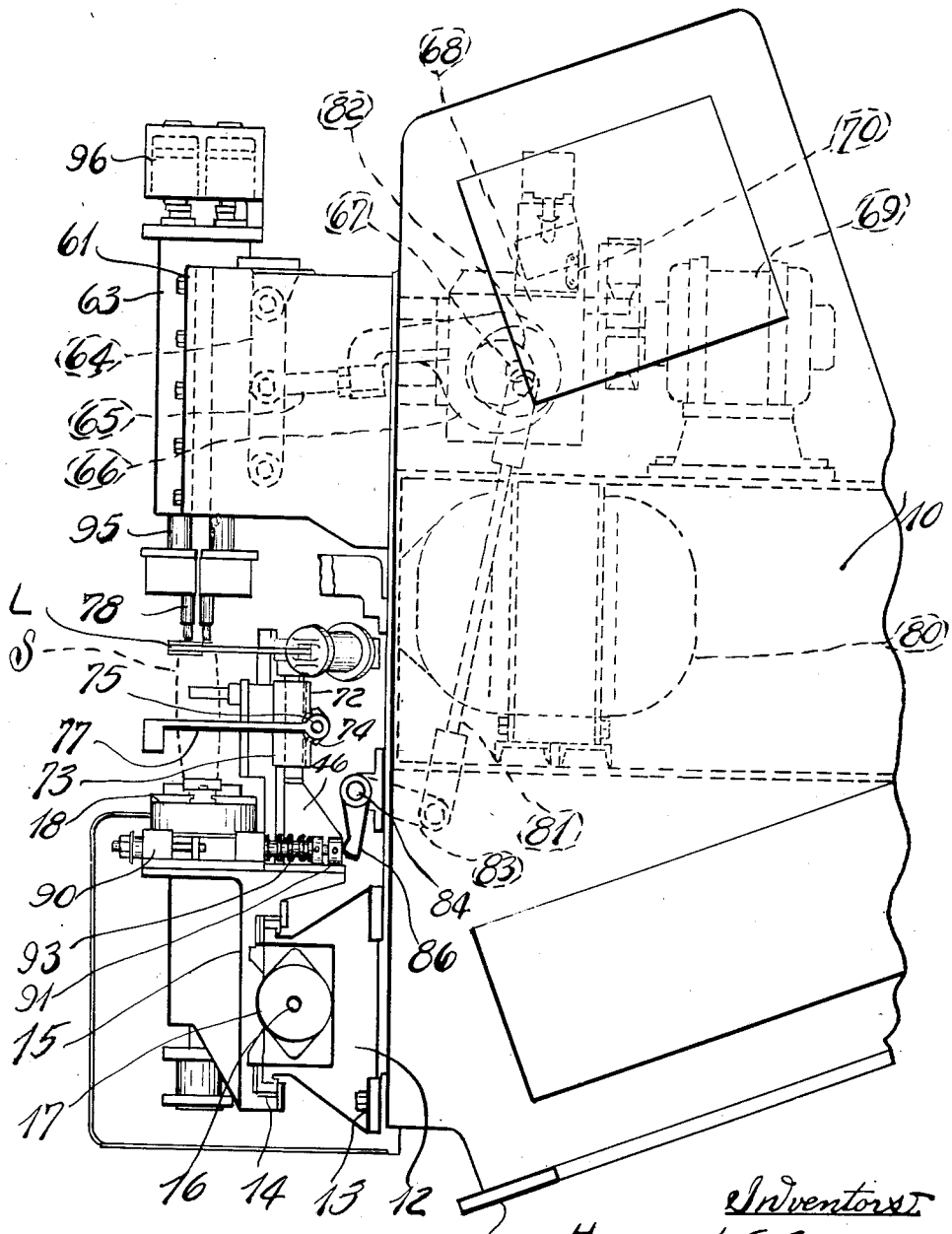

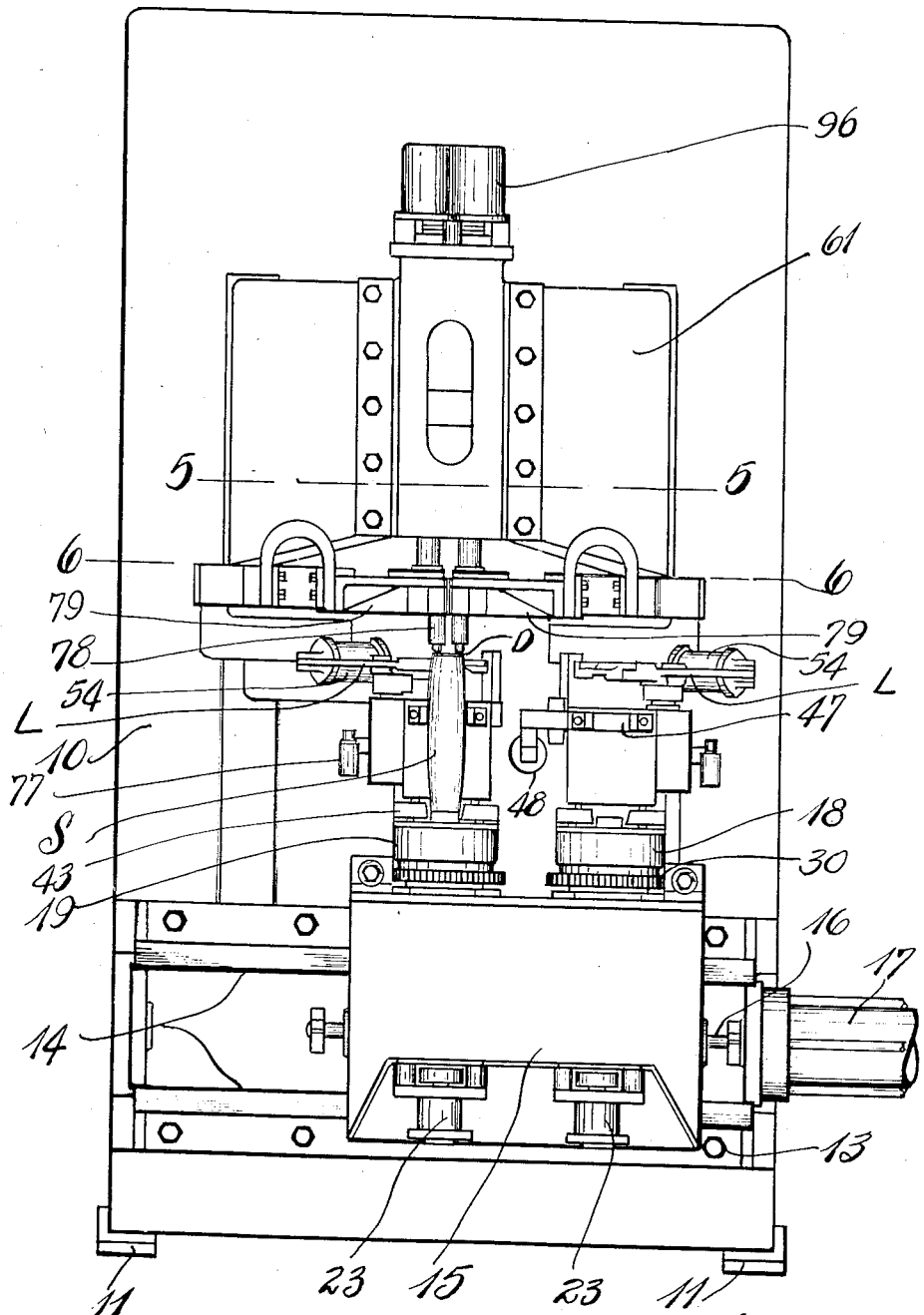

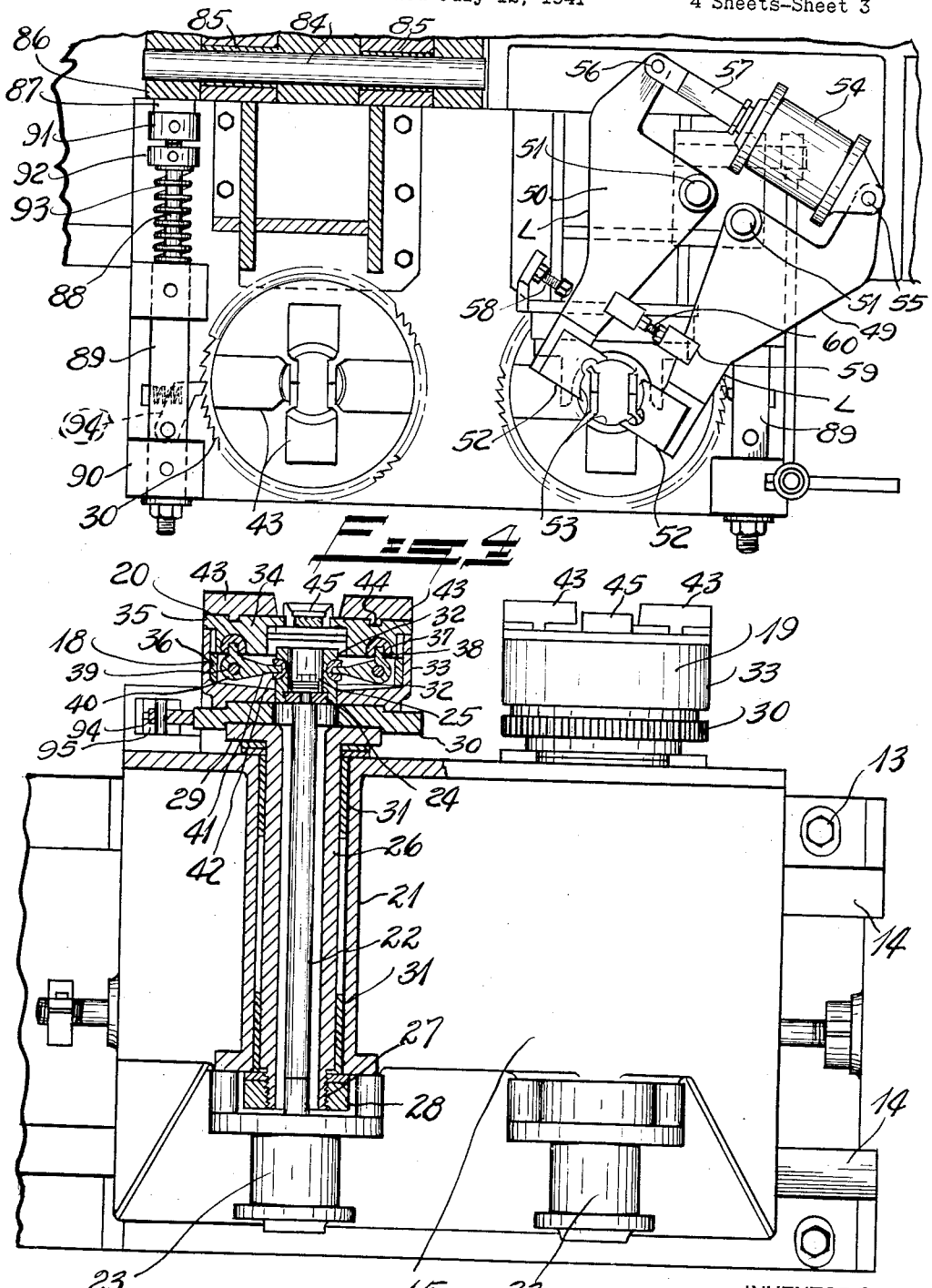

Patented Aug. 18, 1942

2,293,330

UNITED STATES PATENT OFFICE 2,293,330

WELDING MACHINE

Howard C. Cogan and Clyde F. Kaunitz, Bay City, Mich., assignors to National Electric Welding Machines Co., Bay City, Mich.

Application July 12, 1941, Serial No. 402,090

9 Claims. (Cl. 219—4)

This invention relates to electric welding machines and more particularly to a high production machine for welding a disk on the end of an anti-aircraft shell or other similar object.

One of the prime objects of the invention is to design a welding machine provided with "work" rotating and indexing means and having a plurality of electrodes cooperating therewith to produce a sequence of overlapping spot welds by progressing the "work," step by step, between welding periods to form a continuous pressure tight seam.

Another object is to provide a welding machine having reciprocating, plural station fixtures so that when one station is in welding position, the work may be loaded or unloaded in another station fixture or fixtures.

A further object is to provide practical and efficient means for clamping and centering the "work" in the fixture, together with automatic means for rotating said "work" as the welding progresses.

The invention consists in other features and advantages which will appear from the following description and upon examination of the drawings. Structures embodying the invention may partake of different forms and may be varied in their details and still embody the invention. For the purpose of illustration, I have selected a welding machine embodying the invention as an assembly of the various structures, and shall describe the selected form, it being understood that variations may be made, and that certain features may be used to advantage without a corresponding use of other features of the invention, and without departing from the spirit of said invention.

In the drawings:

Fig. 1 is a fragmentary, side elevational view of the welding machine showing the work in position for the welding operation;

Fig. 2 is a front elevational view also showing the "work" in position for welding;

Fig. 3 is an enlarged fragmentary, part sectional front view showing the reciprocating carriage, collets, and associated parts;

Fig. 4 is a fragmentary part sectional top plan view thereof, also showing the locator arms and air cylinder with the righthand collet;

Fig. 5 is an enlarged, fragmentary, sectional plan view showing the ram housing and reciprocating ram, and taken on the line 5—5 of Fig. 2;

Fig. 6 is also an enlarged fragmentary view taken on the line 6—6 of Fig. 2;

Fig. 7 is a front elevational view showing a shell with a disk in position thereon, the locators being shown in section; and Fig. 8 is a top plan view of the shell with the disk welded in position thereon.

In the form of machine illustrated in the drawings, the numeral 10 indicates the welding machine case or housing provided with lugs or feet 11 so that the machine may be bolted or otherwise secured in position by means of screws or bolts (not shown), the housing being preferably disposed at an angle to provide for easy and more efficient loading and operation by the operator.

This machine is a two transformer, two station, automatic rotating and indexing machine having outwardly projecting brackets 12 on the front wall thereof and which are secured in position by means of bolts 13. Vertically spaced, horizontally disposed tracks 14 are carried on said brackets to accommodate and support a carriage 15 which is mounted to slide thereon, said carriage being preferably pressure actuated and including a rod 16, one end of said rod being attached to the carriage, with the opposite end attached to a ram (not shown) which ram is operable in a cylinder 17 actuated either hydraulically or by air as desired.

Identically similar fixtures 18 and 19 respectively, are mounted on this carriage, and each fixture is provided with an air operated centralizing collet clamp 20 for clamping the work in position, and inasmuch as these fixtures are identical, I shall describe but one only.

The collets 20 are of the conventional type, each collet being mounted in the cylindrical section 21 of the carriage housing 15, and comprising a centrally disposed shaft 22 which is actuated from the air cylinder 23, the upper end of the shaft being shouldered and threaded to accommodate an externally threaded collar 24, and a nut 25 serves to hold the members in proper relation.

A sleeve 26 surrounds the shaft 22, the lower end being shouldered and threaded as at 27 to receive the nut 28, the upper end being flanged as at 29 to accommodate the ratchet wheel 30, and sleeve bearings 31 are interposed between the members 21 and 26 as shown.

A hollow cylindrical sleeve 32 is threaded on the member 24 and a housing 33 surrounds said fixture 18 and closely fits the upper face of the ratchet wheel 30. Jaw holders 34 are mounted on the housing 33, and are movable radially in a manner to be presently described, a shoulder 35 being formed on said holders and a collar 36 is provided in said housing and forms a support for said jaw holders as usual. A collar 37 is provided in the lower face of the jaw holders 34, and this collar is suitably grooved to accommodate the legs 38 of the spaced levers 39, said levers being pivotally mounted at 40, with the horizontally disposed legs 41 engaging a collar 42 provided on intermediate sleeve 32.

Jaws 43 are mounted in suitable ways 44 provided in the jaw holder 34, and when the work, which in the accompanying drawing is shown as a shell S to which a thin metal disk D is to be welded, is placed on the collet bar 45 and the shaft 22 actuated from the air cylinder 23, the sleeve assembly 32 will be forced downwardly, sliding the jaws 43 inwardly to clamp the lower end of the shell and hold it firmly and centrally in position. Release is effected by an upward movement of the shaft 22 to spread the jaws 43.

Brackets 46 form a part of the fixture and V-blocks 47 are provided thereon, the shell S being placed against said blocks, and air operated clamps 48 serve to hold the work during the welding operation.

Locators L also form a part of the fixture mechanism and comprise identically similar arms 49 and 50 pivotally mounted at a point intermediate their length on the pins 51, the outer ends of the arms having mounted thereon locator members 52 shouldered as at 53 to engage the side wall and top of the shell, and for centering and confining the disk D which is placed on the upper end thereof.

An air cylinder 54 connects the inner ends of the locator arms 49 and 50, the arm 49 being connected at 55 to the cylinder 54, the opposite arm 50 being connected at 56 to the piston rod 57, so that as the rod is actuated, the arms 49 and 50 will pivot on the pins 51 to swing the locators into or out of engagement with the shell S.

An adjustable stop 58 is provided on the arm 50 to limit the outward swing thereof, and similar stops 59 are provided on the inner edges of the arms 49 and 50 to limit the closing travel of the arms, a screw 60 being provided to facilitate adjustment.

A ram housing 61 is provided on the face of the machine, and guides 62 are mounted therein, a vertically disposed ram 63 being slidably mounted in said guides, and actuated by means of toggles 64, a connecting rod 65 serving to connect said toggles with an eccentric 66 which is in turn mounted on the shaft 67, which shaft is journaled in the gear box 68. A variable speed motor 69 is mounted in the case 10 and is connected to any suitable source of power. A clutch 70, electrically actuated, forms a part of the gear box assembly for automatically starting and stopping ram actuation at the beginning and end of a weld process; however, this driving means can be of any desired design as it forms no part of the present invention.

The assembly of the disk locators includes the air cylinder 54, all of which is vertically adjustable and properly arranged to allow for manufacturing tolerances in shell length. A rack 72 is mounted on the bracket 46 and a vertically disposed sleeve 73 is slidable thereon, a pinion segment 74 meshing with said rack, said pinion being mounted on the shaft 75 which is in turn journaled in suitable bearings (not shown) provided on the sleeve, a handle 77 being provided as shown to facilitate the adjustment.

Electrodes 78 are carried by the ram 63 and are electrically connected as shown at 79 to the secondary circuit of an electric transformer 80, the primary circuit of the transformer being connected in a controlled electric circuit as usual.

The work S is rotated as the welding operation takes place, a connecting rod 81 being connected off-center to the eccentric 82 as shown, with the lower end of said rod connected to one end of a link 83, the opposite end of said link being keyed on a shaft 84 journaled in bearings 85, which are mounted on the face of the machine, and a lever 86 is mounted on said shaft with the head 87 in engagement with the inner end of a horizontally disposed threaded shaft 88, the one end 89 of which is flattened and slidably mounted in a bearing 90 provided on the carriage 15.

A collar 91 is provided on the end of the shaft 88 and a similar collar 92 is spaced from the end as shown, with a coil spring 93 interposed between the said collar and one of the bearings 90.

A ratchet 94 is pivotally mounted in a slotted opening 95 provided in the flattened end 89 of the shaft 88 and is spring pressed as shown, and it will be obvious that as the eccentric 82 is driven, that the lever 86 will actuate the shaft 88 so that the ratchet 94 rides over a predetermined number of teeth on the ratchet wheel 30 and the spring 93 then serves to force the shaft 88 back to original position, rotating the ratchet wheel and collet head accordingly.

Each electrode 78 is mounted in its individual electrode holder spindle 95 and is equalized for welding pressure from single acting air cylinders 96 acting as a cushion or air pressure lock maintaining constant and adjustable air pressure by means of an air reducing valve (not shown).

It will be noted that the face of the machine is disposed at an angle to facilitate the loading and unloading by the operator; and while in the present instance we have shown but two stations or fixtures, it will be clearly understood that any desired number may be utilized, depending on the output required.

The operation sequence of the operation is as follows:

The operator first places a shell body S in the fixture with the lower end between the collet jaws 43, and the body of the shell in the V-block 47 where it is held by the air operated clamp 48; the air cylinder 23 then actuates shaft 22 to move the jaws 43 to firmly clamp the shell in position. The disk D is now placed in proper position on the upper end of each shell, and the locator arms 49 and 50 swing towards each other, the locators 52 accurately and positively centering the disk on the shell; then, as the start and stop switch (not shown) is connected with the one fixture located directly beneath the welding station, the ram moves downwardly so that the electrodes engage the disk and spot weld at the spaced apart points marked X, as shown in Fig. 8 of the drawings; then as the ram and electrodes move upwardly on the upward stroke, the lever 86 actuates the ratchet 30 to rotate the collet 20 through a predetermined arc, after which the electrodes again engage the work, making additional spot welds, which spots will overlap as the work progresses until a complete seam is secured. (See Fig. 8 in which the overlapping spots are shown.) When the seam is completed, the actuating mechanism slides the carriage on the tracks 14 to bring the opposite loaded fixture into position beneath the welding head where the operation is repeated, the operator unloading the welded shell from the fixture and replacing it with a shell to be welded while the shell in the other fixture is being welded. The operation is automatic and rapid so that high production with a minimum of labor is assured.

From the foregoing description it will be obvious that I have perfected a very simple, practical, and inexpensive welding machine for high production of welded work in a minimum of time, and at minimum cost.

What we claim is:

1. In an electric welding machine comprising a frame, a carriage reciprocatingly mounted thereon, a work supporting fixture mounted on the carriage, means for clamping the work on the fixture, a reciprocating ram, a plurality of electrodes carried by said ram, and indexing means synchronized with said ram reciprocating means for rotating said work between the welding periods.

2. In an electric welding machine comprising a frame, a carriage reciprocatingly mounted thereon, individual work supporting fixtures mounted on said carriage, means for clamping said work on said fixtures, a reciprocating ram, a plurality of electrodes carried thereby, indexing means synchronized with said ram for rotating the work as the machine is operated, and means for actuating said indexing means on the upstroke of said ram.

3. In an electric welding machine for welding a disk on a shell comprising a frame, a horizontally disposed reciprocating carriage mounted thereon, a plurality of adjustable fixtures mounted on said carriage; means for clamping work in the fixtures and including locators for engaging the upper end of the work, a ram, means for reciprocating said ram, and indexing means associated with said ram reciprocating means for rotating said work between the welding periods.

4. In an electric welding machine having a frame, a horizontally disposed carriage reciprocatingly mounted thereon, collets on said carriage and adapted to receive and clamp the lower end of the work in position thereon, locators also mounted on the carriage and engageable with the upper end of the work, a ram, a plurality of electrodes carried thereby, means for reciprocating said ram, and indexing means synchronized with said ram reciprocating means for rotating said work between the welding periods.

5. In an electric welding machine having a frame, a horizontally disposed carriage reciprocatingly mounted thereon, a plurality of work supporting fixtures on said carriage, vertically spaced clamping members associated with the fixtures for clamping the work thereon, a reciprocating ram, a plurality of electrodes carried by the ram, driving means for actuating said ram, and indexing means associated with said fixtures and actuated by said ram driving means for progressing the work, step by step, between the welding periods.

6. In an electric welding machine having a frame, the front wall of which is disposed at an angle with relation to a vertical line, a horizontally disposed carriage reciprocatingly mounted on said frame, work supporting fixtures on said carriage, means for clamping the work in position on said fixtures, a vertically reciprocating ram, a plurality of electrodes carried thereby; means for reciprocating said ram to produce a plurality of welds on each stroke of said ram, an indexing means forming a part of each fixture, spring pressed means associated with said indexing means, and means connected to said ram reciprocating means for actuating said spring pressed means.

7. An apparatus for welding a disk on a cylindrical shell comprising a frame having a carriage reciprocatingly mounted thereon, fixtures mounted on said carriage, means for clamping work on the fixtures, a ram, a plurality of electrodes carried thereby, means for reciprocating said ram, indexing means associated with said fixtures, and means connected with said ram reciprocating means for rotating the work, step by step, between welding periods.

8. An apparatus for welding a disk on a shell comprising a frame, a horizontally disposed carriage reciprocatingly mounted thereon, horizontally spaced fixtures including collets mounted on said carriage, clamping means associated therewith for securing the work in position, locator means engagable with the upper end of the work for centering the disk on the shell, a ram, a plurality of electrodes carried thereby; means for driving said ram, indexing means associated with said collets, and driving means connected with said ram reciprocating means for actuating the indexing means, step by step, between welding periods.

9. In an electric welding machine for welding a disk on a shell, comprising a frame; a carriage reciprocatingly mounted thereon; individual work supporting fixtures mounted on said carriage; means for clamping work on said fixtures; a reciprocating ram; a plurality of electrodes carried thereby; locators engageable with said shell and disk for holding the disk in position until the first welds are made; and indexing means associated and synchronized with the reciprocating ram for rotating the work between the welding periods.

HOWARD C. COGAN.
CLYDE F. KAUNITZ.